May 28, 1929.　　　　　T. MIDGLEY　　　　　1,714,799
METHOD AND APPARATUS FOR SIMULTANEOUSLY
CUTTING AND WINDING BIAS STRIPS
Filed May 3, 1926　　　5 Sheets-Sheet 1

May 28, 1929.   T. MIDGLEY   1,714,799
METHOD AND APPARATUS FOR SIMULTANEOUSLY
CUTTING AND WINDING BIAS STRIPS
Filed May 3, 1926   5 Sheets-Sheet 2

INVENTOR.
BY Thomas Midgley
Edward C. Taylor
ATTORNEY.

Patented May 28, 1929.

1,714,799

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND APPARATUS FOR SIMULTANEOUSLY CUTTING AND WINDING BIAS STRIPS.

Application filed May 3, 1926. Serial No. 106,304.

This invention relates to a method and an apparatus for handling bias-cut material, particularly in the building of tire casings from rubberized cord fabric. The invention will be shown and described as applied to the building of tire casings in flat form by the method of my application, Serial No. 108,083, filed May 10, 1926. The invention, however, is not restricted to such use and may be applied to the building of so-called pockets or endless multi-ply bands of tire building material formed without beads, or to the building of tire casings in flat or substantially flat form on a support such as a drum. It may also be applied in certain aspects to the handling of bias-cut material in other manners and for other uses.

The objects of the invention are generally the promotion of rapidity, economy and accuracy in the handling of bias-cut material. Referring more particularly to the preferred use of the invention in the building of tire casings, other objects appear, such for example as the avoidance of handling of the rubberized bias-cut material between the time when it is cut and the time when it is incorporated in the tire casing; the elimination of storage of stock between the cutting and building stages, with a consequent reduction of inventory and a possibility of closer working to a desired schedule; the increasing of the accuracy with which the material is laid up in the tire, both because of the avoidance of handling of the material, with consequent errors in placing, and because of the elimination of the time interval between cutting and building, thus removing the possibility of the material warping or otherwise becoming distorted; and the reversal of the cord angle in successive plies without the necessity of reversing the position of the plies themselves prior to the building operation.

Referring to the drawings.

In general, it may be said that my improved method contemplates the cutting of bias strips from bias-cut cord fabric and rolling up each strip as it is being cut. In its embodiment as applied to the building of tire casings, it contemplates the cutting of bias-cut strips from a wide web of rubberized cord fabric and winding the strips progressively as they are cut to produce either a pocket or, by the addition of bead anchorages, a tire casing in flat form.

Figure 1:
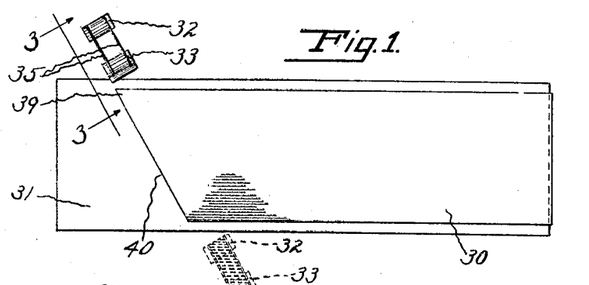
Fig. 1 is a diagrammatic plan view illustrative of the improved method.
Figure 2:
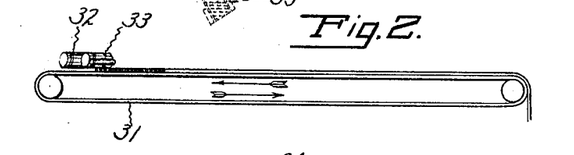
Fig. 2 is a side elevation thereof.

In considering the steps of this process, it will be useful to have reference to a skeleton apparatus by which the method may be conveniently practiced. A more complete apparatus will be described below. A web of cord fabric 30 is, as shown in Fig. 1, fed out upon a belt 31. A carriage, upon which are mounted rolls 32 and 33, is mounted for reciprocation across the path of the strip 30 along a diagonal or bias line corresponding to the cord angle desired in the bias-cut strips. The method has been shown in Figs. 1 to 14 as adapted to the laying up of the bias-cut material directly upon endless bead anchorages according to the method of my copending application Serial No. 108,083. For this purpose the rolls 32 and 33 are grooved, as at 34, for the reception of endless bead anchorages 35, preferably constructed of a metallic core with a fairly loose covering of rubberized fabric. A pair of these endless anchorages are looped over the rollers 32 and 33 and the rollers moved apart to bring the anchorages taut. Associated with the rollers are cutting devices 36 and 37, preferably in the form of rotating disks so mounted as to be capable of motion into and out of the plane of the web 30. A roller 38 is mounted in association with one of the rolls 32 or 33, preferably the latter, so as to press the bias-cut material firmly against the rubberized coating of the bead anchorages.

With this elementary apparatus in mind, the production of a tire casing by my improved method will be considered. When the various elements are in the position of Fig. 1 it will be seen that an acute corner 39 of the web 30 lies adjacent the roll 33. The winding unit comprising the two rollers is advanced somewhat beyond the position of Fig. 1 to the position shown in Fig. 3, and the corner 39 is picked up by the operator and tacked against the rubberized covering of one of the bead anchorages 35 (see also Fig. 4). The winding unit is now caused to travel along its bias path across the web 30, the cutter 36 being depressed during this motion so as to sever the web on a bias line in advance of the approach of roll 33 and in the direction indicated by the arrow in Fig. 4. During this passage across the web the rolls 32 and 33 are both held at such an elevation above the belt 31 that they do not contact with it and are positively rotated, by any means or by hand, in the direction of the arrows in Fig. 3. During this movement of the winding unit across the web, the severance of the bias strip by the cutter 36 is continuously and progressively followed by the winding of this strip upon the bead wires. The rotation of the rolls will carry this strip over the two rolls, and the action of the pressure roller 38 will attach it firmly to the bead anchorages.

Figure 4:
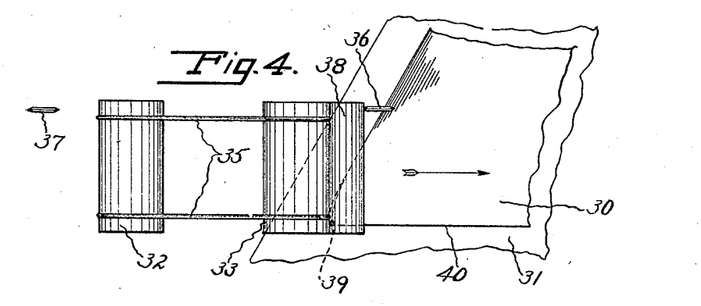
Fig. 4 is a diagrammatic top plan view of Fig. 3.

It is generally preferable to have the edges of the bias strip folded around the bead anchorages so that the latter are firmly locked into the bead edges of the tire casing. For this purpose the cutter 36 is, as is shown in Fig. 4, offset from the plane of the adjacent bead anchorages so as to give a sufficient amount of stock for folding. Similarly, the originally bias-cut end 40 of the web 30 is so positioned as to extend slightly beyond the plane of the other anchorage 35 an amount sufficient to give the overlap desired at this point. The folding of the bias strip around the bead anchorages can be accomplished by hand or by mechanical devices, either as a progressive operation during the winding up of the strip, or as a subsequent separate operation. It is preferable, however, to make this folding operation progressively continuous with the winding, as this method of procedure greatly reduces the time necessary for the production of a tire casing.

Figure 5:
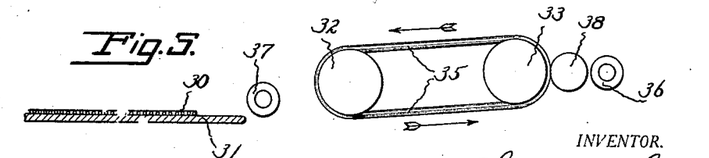
Fig. 5 is a view similar to Fig. 3 but illustrating the position of the parts after the cutting and laying up of one ply of material.
Figures 6, 7:
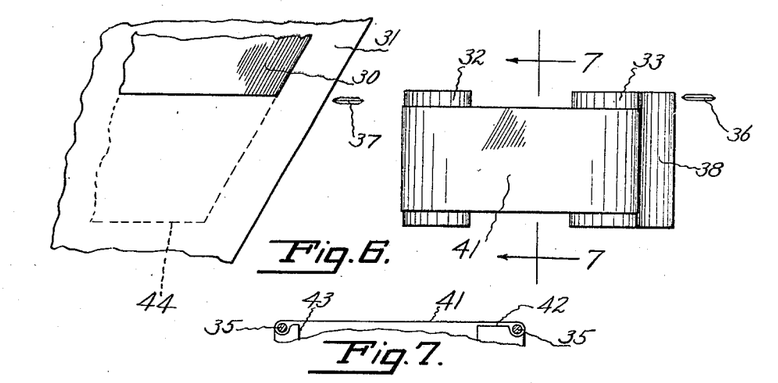
Fig. 6 is a plan view of Fig. 5.
Fig. 7 is a diagrammatic section showing the product of the operations up to this point.
Figure 8:
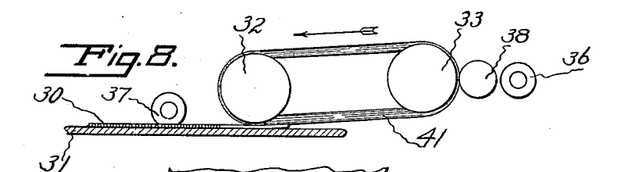
Fig. 8 is a view similar to Fig. 5, showing the initiation of the cutting and laying of a second ply of material.
Figure 9:
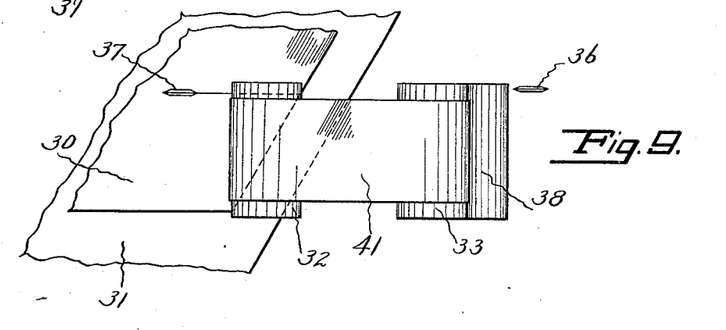
Fig. 9 is a top plan view of Fig. 8.

In Figs. 5 and 6 the winding unit is shown in the position it assumes after the ply cut as previously described has been completely wound up. The width of the web 30 is so chosen, either by its original formation or by the piecing together of two or more narrow webs, that the length of the bias strip cut from it will exactly equal the distance around the outer periphery of the bead anchorages. Therefore, after a complete passage of the winding unit across the web, one complete ply of the rubberized bias-cut material will have been severed from the web and adherently secured in position on the bead anchorages. The product resulting from this operation is illustrated in diagrammatic section in Fig. 7, in which the ply of bias-cut material is indicated at 41 with edges 42 and 43 folded around the bead anchorages 35. It will be noted that the edge 42 is shown as being wider than the edge 43. This is for the purpose of producing an offset condition of the first ply with respect to the second, as is preferable and as will more clearly appear below.

With the parts in the position of Figs. 5 and 6, the web 30 is advanced to the position indicated in dotted lines in Fig. 6, with the bias-cut leading end 44 of the web located in such a position that it will extend beyond the edge of the partially constructed tire casing on the winding unit a distance sufficient to provide the marginal overlap desired. The roll 32 is now lowered to a position where it will contact with the surface of the web 30 resting on the conveyor 31.

Figure 3:
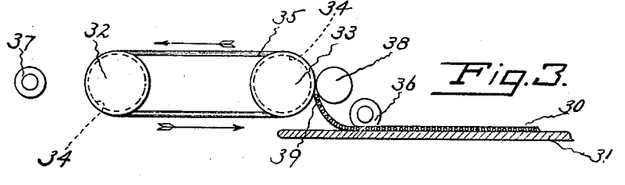
Fig. 3 is a view on a larger scale, looking generally along line 3—3 of Fig. 1 but showing a later stage of the operation.

The return passage across the web is now made without the operator picking up the corner of the web as in the preceding passage. The roll 32 being held in contact with the surface of the web, the bias-cut strip produced will be picked up by adhesive contact with the first ply 41. Cutting on the return stroke is accomplished by the cutter 37, this being lowered into operative position and the cutter 36 raised out of the way of the web. The cutter 37 is shown in the drawings as being out of line with the cutter 36, so as to produce a different amount of marginal overlap in the bias strips produced by them. Cutting and winding in the return passage follow each other continuously and progressively exactly as in the first passage, with the exception that the bias-cut strip passes under the now leading roll 32 instead of over it as was the case with the roll 33, which led on the first passage. As in the previous case, folding of the edges may be accomplished either manually or by a suitable folding device. It may be mentioned for clarity that it is immaterial from which side of the web the operation is started in laying up a two-ply band. The picking up of the corner of the web for what might be termed the reverse winding, as in Fig. 3, is always done on the starting of the stroke from that side of the web at which the acute corner 39 is located, whether this is the first or second passage.

Figure 10:
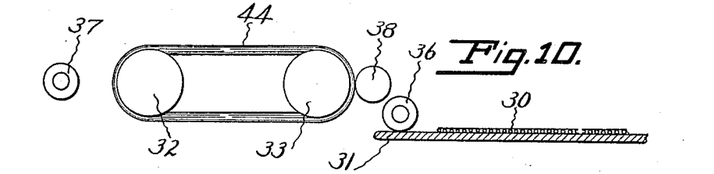
Fig. 10 is a view similar to Fig. 8, showing the completion of the cutting and laying of the second ply of material.
Figure 11:
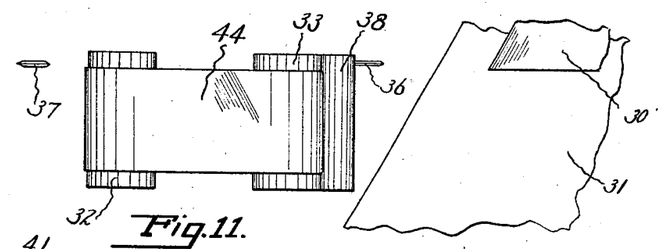
Fig. 11 is a top plan view of Fig. 10.

The position of the parts after the completion of the stroke is shown in Figs. 10 and 11, in which the second ply 44 is completely applied and folded around the bead anchorages. The product resulting from these two passages across the web is shown diagrammatically in Fig. 12. The overlapping edges 45 and 46 of the second ply 44 are respectively shorter and longer than the marginal edges of the underlying ply 41. The stepped-off effect thus produced is of utility in distributing stresses in the tire casing and in preventing abrupt changes in thickness or flexibility.

Figures 12, 13, 14:
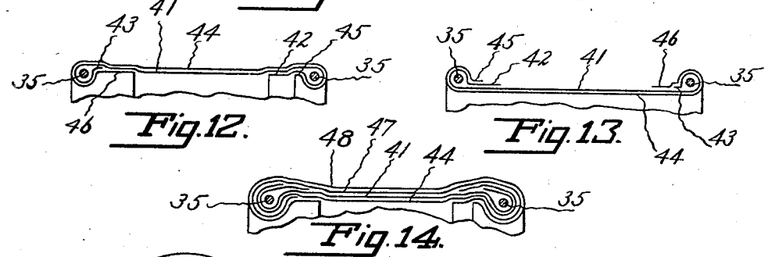
Fig. 12 is a diagrammatic section showing the product resulting from the laying of the first two plies of material.
Fig. 13 is a similar view showing the band of Fig. 12 inverted and prepared for further building operations in accordance with the method of my copending application Serial No. 108,083.
Fig. 14 is a similar view showing the addition of two more plies of material.

If the method of my copending application Serial No. 108,083 is being followed, the two-ply band illustrated in Fig. 12 is now removed from the winding unit and inverted, bringing it to the condition shown in Fig. 13. This inverted band may now be placed on the same winding unit, or upon another one having rolls of slightly different contour, and by a forward and back passage across the web, similar to those described above, two additional plies 47 and 48 may be applied. The application of these two plies has not been shown in detail as it is similar to the application of plies 41 and 44. The resulting four-ply product is shown in Fig. 14.

Figure 15:
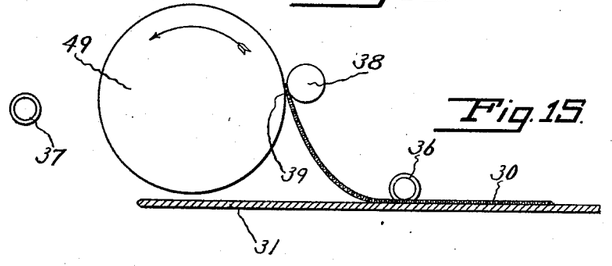
Fig. 15 is a view similar to Fig. 3, illustrative of the application of my invention to the production of pockets or to the building of flat band tire casings upon a drum.
Figure 16:
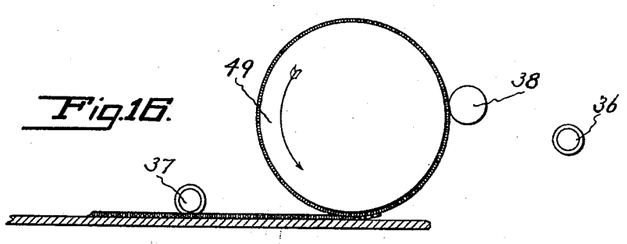
Fig. 16 is a similar view showing the initiation of the cutting and laying up of the second ply.

This invention may also be utilized in the production of so-called "pockets", or multiply bands of bias-cut material formed endless without the application of bead anchorages and used in some processes in the formation of tire casings. If it is desired to build pockets of this type, the winding unit previously described, comprising the rolls 32 and 33, is replaced by a drum 49, the cutters 36 and 37 and the roll 38 remaining as before. The leading corner 39 of the web 30 is attached to the surface of the drum, either adhesively or mechanically, and the two passages across the web are made as in the case of the winding unit previously described, the drum remaining out of contact with the belt on the first stroke (Fig. 15) and in contact with the web on the belt on the return stroke (Fig. 16). The cutters are alternately elevated and depressed, as shown in these two figures, in the same manner as described previously in the direct building of a tire casing.

Figure 17:
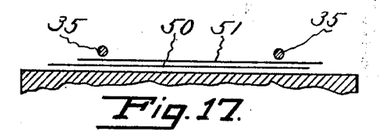
Fig. 17 is a diagrammatic section through the drum and the partially constructed tire casing thereon, showing the manner of applying beads in the building of a flat band casing by this modification.
Figure 18:
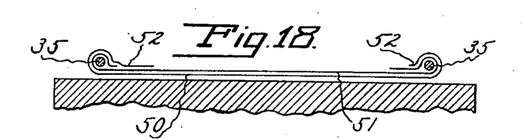
Fig. 18 is a view similar to Fig. 17 but showing the plies folded around the bead anchorages.
Figure 19:
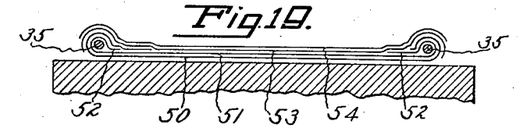
Fig. 19 is a similar view showing the addition of two more plies of material.

If it is desired to construct a tire casing directly on a drum, this can be done by laying up the first two plies 50 and 51 as for the building of a pocket, placing the bead anchorages 35 over these plies, and folding the plies outwardly around the anchorages as at 52. Additional plies 53 and 54 may now be applied in a similar manner, the resulting product being shown in Fig. 19.

In the modifications thus far described it will be seen that, due to the difference in the manner of picking up the first and second plies of each pair, a reversal of the direction of cord angle will be attained even though the direction of rotation of the winding rolls or drum is not changed. This difference in cord angle is indicated by the diagonal cord lines in Figs. 6 and 11. In case the reversal of angle in succeeding plies is not desired, the acute corner 39 need not be picked up as described, roll 32 being lowered on one stroke and roll 33 on the return. Changes in angles other than reversals can be secured by varying the angle at which the cutting and winding unit is passed across the web.

Figure 20:
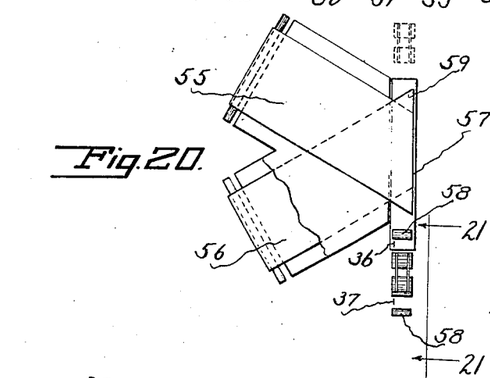
Fig. 20 is a diagrammatic plan view of a modification in which two plies of material are cut and laid up at one operation.
Figure 21:
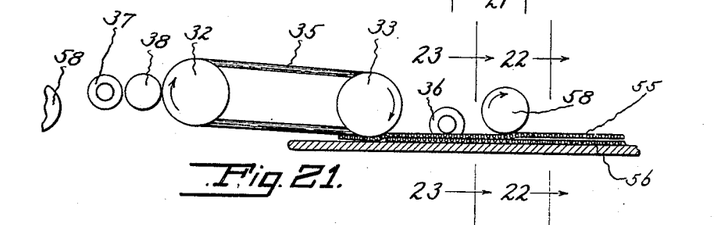
Fig. 21 is a diagrammatic elevation on line 21—21 of Fig. 20, showing the operation at a slightly later stage.
Figure 22:
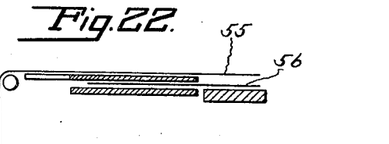
Fig. 22 is a diagrammatic section on line 22—22 of Fig. 21.
Figure 23:
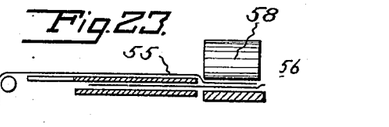
Fig. 23 is a diagrammatic section on line 23—23 of Fig. 21.

Another method of laying two plies of material and securing a reversal of cord angle is shown in Figs. 20 to 23. This modification makes use of the method of cutting bias strips described in my Patent 1,611,927. According to this method two webs of material 55 and 56 are led in superposed paths with their directions of length at an angle to each other. The edges of the two strips are initially trimmed off along a bias line 57. One of the cutting and winding units previously described is now passed across the superposed strips along a line at right angles to the bisector of the angle between the two webs. The winding unit is in this case supplemented by rolls 58 at each end which, as shown in Figs. 21 and 23, press the two webs together. The cutter 36, or 37 as the case may be, severs the two superposed webs simultaneously and they are wound up in the same manner as the single plies in the production of a tire casing by the first described method.

Figure 24:
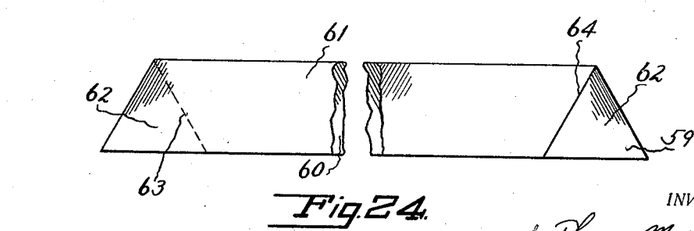
Fig. 24 is a plan view of the two-ply strip cut as shown in the last four figures, this strip being shown for clarity as flat and not wound up.

In that passage across the superposed webs, the start of which is shown in Fig. 20, the roll 33 is caused to run in contact with the webs as indicated in Fig. 21. On the return stroke the leading corner 59 is picked up and applied to the bead wires 35, as in the case of the corner 39 in the first modification. By this means both passages of the winding unit can be utilized, two plies being laid at each passage. The condition of the two-ply band as it is wound up is indicated in Fig. 24, the two plies being shown at 60 and 61. From the showing in this figure it can be seen that if it is desired, as it usually will be, to have the single-ply end portions 62 overlap each other with the edges of the other plies forming butt-joints, this result will be had by rolling up the two-ply band as on a drum passed over it from left to right in Fig. 24, but will not be produced by a similar passage from right to left. In the first passage the first contact of the band with the winding form would be the single-ply portion at the left, which would leave the edge of the second ply indicated by 63 exposed. In the passage from right to left the edge 64 of the two-ply portion would lie in contact with the winding form, preventing a butt-joint being made with the other two-ply edge 63. It is for this reason that the different method of winding is used on the two strokes. On the stroke from left to right, as mentioned previously, the roll 33 is kept in rolling contact with the two-ply web on the belt. On the passage from right to left the roll 32 is held out of contact with the belt and the leading edge 59 picked up as was the case with the edge 39.

I will now proceed to describe a simple apparatus by which this method may be practiced. This apparatus is shown in as simple form as possible in order to show the inherent simplicity of the method. Refinements, of course, may be desirable in case it is necessary to increase the speed of the apparatus.

Figures 25, 26:
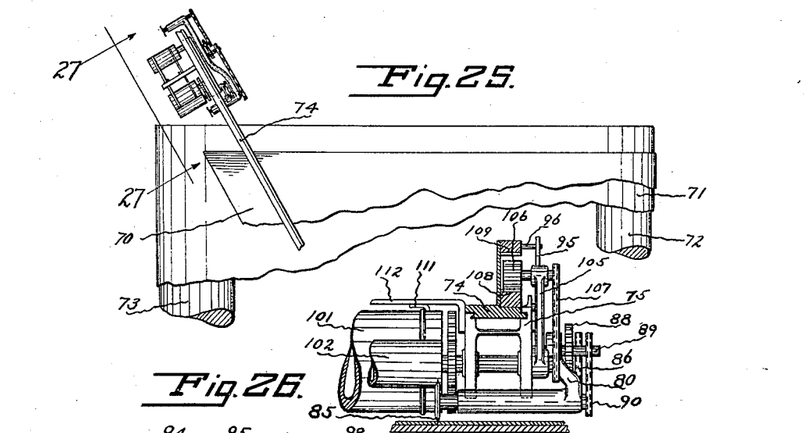
Fig. 25 is a top plan view, corresponding to Fig. 1, showing a simple mechanism by which the method as illustrated in the preceding views can be practiced.
Fig. 26 is a section on line 26—26 of Fig. 27.

In the embodiment shown the web of calendered fabric 70 is supplied upon a conveyor belt 71 mounted on suitable rollers or pulleys 72 and 73. Extending across the conveyor on a diagonal or bias line is a trackway 74 having suitable groove or other connection with a sliding carriage 75. At one end the carriage 75 is provided with vertical guideways 76 in which slides a box 77 carrying the shaft 78 of a roller 79. This box is secured to a rocking arm 80 pivoted at 81 to the carriage so that by a rocking of the arm roll 79 may be raised or lowered a slight amount. The arm projects beyond this roll and has at its end a journal for the shaft 82 of a cutting wheel 83. At the other end of the rocking arm is a similar bearing for the shaft 84 of a cutting wheel 85. The shaft 82 is connected by a sprocket and chain 86 with a short shaft 87 journaled in the arm 80 and connected by gearing 88 with a shaft 89 mounted on the carriage 75 coaxially with the pivot 81. A sprocket and chain connection 90 joins the shaft 89 with the shaft 84. By applying suitable rotative power to the shaft 89, the cutters 83 and 85 will be rotated in the direction of the arrows in Fig. 27. This direction is preferably chosen as indicated so that the cutter which is in operation always acts against the under-lying web 70 in a direction opposite to the path at which it is being guided across the web.

Figure 27:
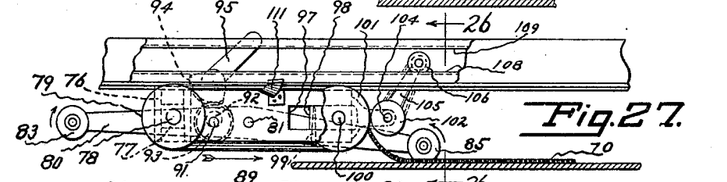
Fig. 27 is an elevation on a larger scale, taken along line 27—27 of Fig. 25 but showing the parts at a later stage of operation.
Figure 28:
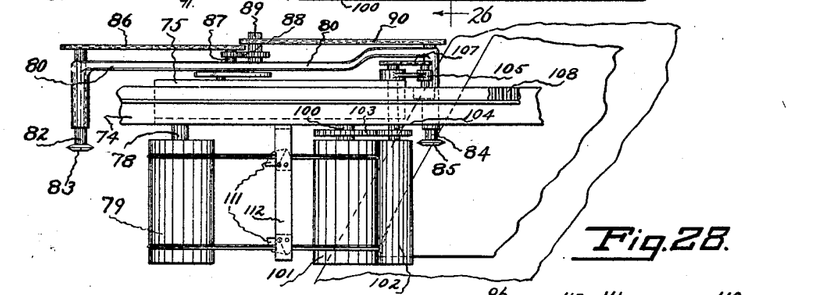
Fig. 28 is a top plan view of the parts as shown in Fig. 17.
Figure 29:
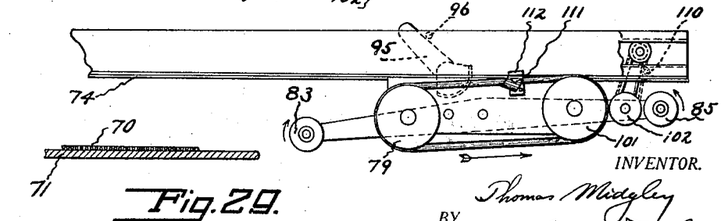
Fig. 29 is a view similar to Fig. 27 but showing the parts in the positions they occupy at the completion of the cutting and laying up of the first ply.

In order to rock the arm 80, a shaft 91 is journaled in the carriage and carries an eccentric portion 92 having bearing in the arm 80. A gear 93 on shaft 91 meshes with a segment 94 journaled in the carriage and having a projecting arm 95 adapted to contact with stops 96 mounted upon the trackway. As the carriage approaches the end of its travel in either direction, the arm 95 contacts with one of the stops 96, causing the arm 95 to be swung and the rocker 80 to be tilted in one direction or the other.

Carried in slides 97 in the carriage are blocks 98 which may be held in place by any suitable means, as a taper pin 99. In these blocks is journaled the shaft 100 of a roll 101. A pressing roller 102 is connected to roll 101 by gearing 103 so that they rotate in opposite directions. On the shaft 104 of roller 102 is mounted a short swinging arm 105 upon which is carried a pinion 106 connected by a chain and sprocket 107 with shaft 104. The pinion 106 is capable of meshing with either a rack 108 or a rack 109, each mounted upon the trackway 71. Stops 110 at the end of the trackway serve to swing the arm 105 so as to cause meshing of the pinion alternately with the two racks.

The operation of this device is as follows. As the carriage is propelled, by hand or by any suitable motive power, from that end of the trackway at which it is shown in Fig. 25 to the other, both rolls 79 and 101 are out of contact with the underlying web 70 and cutter 85 is in operative position. During this stroke the web will be severed to form a bias strip and this strip will be wound up upon the bead anchorages, as described in connection with Figs. 3 to 6. When the end of the stroke is reached, arms 95 and 105 are swung by their respective stops. The motion of arm 95 drops the roll 79 into contact with the underlying web of fabric and shifts the cutter 83 into and the cutter 85 out of operative position. The motion of arm 105 shifts the pinion 106 into contact with the upper instead of the lower rack. The result of this latter shift is to keep the direction of rotation of the rolls 79 and 101 in a constant direction irrespective of the direction in which the carriage is moved, for the purposes discussed above in dealing with the method.

The manner in which the fabric is laid up upon the bead anchorages need not be repeated here as it has been thoroughly considered above. If the edges of the fabric are to be folded around the beads, folding members 111 may be secured to a bar 112 mounted upon the carriage. These folders are shown as of the plow type, serving to turn the material gradually around the bead anchorages, firm adherence of the folded part to the underlying body portion of the material being secured during its passage around the bead supporting rolls.

Having thus described my invention, I claim:

1. The method which comprises supporting a flat web, severing a bias-cut strip from the web while so supported, and rolling up the strip as it is being cut as an operation progressively and continuously following the cutting and while the strip is still supported in the position in which it was cut, whereby accurate alignment of the bias strip will be preserved during the rolling-up step.

2. A method of forming a carcass ply in the manufacture of tire casings which comprises supporting a web of carcass material, severing the web along bias lines while so supported, and winding the bias strips so produced upon spaced annular bead anchorages while still so supported.

3. A method of forming carcass plies in the manufacture of tire casings which comprises passing a winding form diagonally across a web of carcass material adjacent a bias-cut end thereof, and severing the web upon a bias line in advance of the passage of the form, whereby a bias strip is severed from the web and wound upon the form as successive and progressively continuous operations.

4. A method of forming a carcass ply in the manufacture of tire casings which comprises supporting a pair of annular bead anchorages in spaced relation, passing the anchorages diagonally across a web of carcass material adjacent a bias-cut end thereof, severing the web upon a bias line in advance of the passage of the anchorages, and attaching progressively to the anchorages during such passage the bias strip so formed.

5. A method of laminating carcass plies in the manufacture of tire casings which comprises passing a winding form successively in reverse directions over a pair of flat strips of bias-cut cord fabric, and rotating the form in one constant direction during the two traverses, whereby the two strips will be laid upon the form with their cords extending in opposite angular directions.

6. A method of laminating carcass plies in the manufacture of tire casings and the like which comprises locating a winding form adjacent the acute angled side of the bias-cut end of a web of cord fabric, tacking the acute angled portion to the leading side of the form with its end pointing upwardly, passing a cutter across the web upon a bias line, thereby severing a bias-cut strip from the web, advancing the winding form across the web in the direction of the bias cut and rotating it in the opposite direction from that which would result from rolling contact with the web, whereby the bias-cut strip is wound on the form, passing a cutter back across the web upon a bias line parallel to the first, passing the winding form back across the web, and rotating the form during this return passage in the direction resulting from rolling contact with the web, whereby the second bias-cut strip is wound upon the form with its cords crossing those in the first strip at opposite angles.

7. A method of laminating carcass plies in the manufacture of tire casings and the like which comprises locating a winding form adjacent an acute angle of a bias-cut strip of cord fabric, tacking the acute angled portion of the strip to the leading side of the form with its end pointing upwardly, advancing the winding form across the strip and rotating it in the opposite direction from that which would result from rolling contact with the strip, whereby the bias-cut strip is wound on the form, passing the winding form back across a second bias-cut strip having its cords arranged at the same angles as in the first strip, and rotating the form during this return passage in the direction resulting from rolling contact with the strip, whereby the second bias-cut strip is wound upon the form with its cords crossing those in the first strip at opposite angles.

8. A method of laminating carcass plies in the manufacture of tire casings which comprises supporting a pair of annular bead anchorages in spaced relation, passing the anchorages twice across a web of bias-cut cord fabric, severing the web upon a bias line in advance of the approach of the anchorages at each passage, rotating the anchorages as in rolling contact with the web upon one passage and in the reverse relative direction on the other passage, winding progressively as it is cut the bias strip severed on each passage, and pressing the bias strips into adhesive contact with the anchorages as they are being wound up.

9. The method which consists in cutting bias strips from rubberized cord fabric, rolling up successive strips as they are being cut with the cord angle of one strip reversed with respect to a previously cut strip, said strips being rolled one on the other.

10. A machine for building tire casings which comprises a tire building form, means for guiding the form diagonally across a web of tire building material, means acting in advance of the form for severing a bias strip from the web, and means coordinated with the form and the severing means for applying the bias strip so cut progressively and continuously to the form.

11. A machine for cutting and winding bias strips which comprises a winding form, a cutter, and means for guiding the cutter and winding form diagonally and progressively across a web to sever a bias strip therefrom and wind it upon the form as a continuous and progressive operation.

12. A machine for cutting and winding bias strips which comprises means for supporting a web of material, mechanism for severing the web along bias lines while supported by said means, and a winding device traversing the support parallel to the bias cuts and operating during such traverse to wind up the bias-cut strips while they are still supported by said means.

13. A machine for making tire casings which comprises means for supporting a web of carcass material, mechanism for serving the web along bias lines while supported by said means, a device for rolling a pair of bead anchorages in spaced relation on a bias path over and across the bias strips while the strips are still so supported, and means for pressing the strips into adhesive contact with the bead anchorages while the strips are still so supported.

14. A machine for cutting and winding bias strips which comprises means for supporting a web of material, a trackway extending diagonally across the web, a carriage mounted for reciprocation on the trackway, and a cutting device and a winding form mounted upon the carriage, the cutting device and the winding form being so positioned that upon motion of the carriage across the web a bias strip of material will be severed and wound up as a continuous and progressive operation.

15. A machine for making laminated bands of bias-cut cord fabric which comprises means for supporting a web of cord fabric, a trackway extending diagonally across the web, a carriage mounted for reciprocation upon the trackway, a winding device movable with the carriage, means for rotating the winding device in one direction irrespective of the direction of motion of the carriage, means for holding the winding device either in or out of contact with the underlying web, and a cutting device supported by the carriage so as to sever a bias strip from the web in advance of the approach of the winding device.

16. A machine for making laminated bands of bias-cut cord fabric which comprises means for supporting a web of cord fabric, a trackway extending diagonally across the web, a carriage mounted for reciprocation upon the trackway, a winding device movable with the carriage, means for rotating the winding device in one direction irrespective of the direction of motion of the carriage, means for holding the winding device either in or out of contact with the underlying web, a pair of cutting devices supported on the carriage at either end of the winding device, and means for lowering into cutting contact with the web that one of the cutting devices in advance of the winding device.

17. A machine for making tire casings which comprises means for supporting a web of cord fabric, a trackway extending diagonally across the web, a carriage mounted for reciprocation upon the trackway, a pair of rolls spaced apart upon the carriage and having grooves for the reception of annular bead anchorages, means for driving at least one of said rolls at a speed corresponding to the speed of translation of the carriage but in one constant direction of rotation, means for pressing one of the rolls against the web supporting means while the carriage is being moved in one direction and for holding it away from such supporting means while the carriage is being moved in the other direction, and cutting devices supported at either end of the carriage and at one side of the rolls so as to sever a bias strip from the web in advance of the carriage as the latter is moved in either direction.

THOMAS MIDGLEY.